United States Patent
Han

(10) Patent No.: US 8,717,493 B2
(45) Date of Patent: May 6, 2014

(54) SHUTTER DEVICE

(75) Inventor: Jinsuk Han, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 684 days.

(21) Appl. No.: 12/952,660

(22) Filed: Nov. 23, 2010

(65) Prior Publication Data

US 2011/0122311 A1 May 26, 2011

(30) Foreign Application Priority Data

Nov. 23, 2009 (KR) .................. 10-2009-0113520
Dec. 31, 2009 (KR) .................. 10-2009-0135310

(51) Int. Cl.
*H04N 5/238* (2006.01)
*G03B 9/08* (2006.01)
*G03B 9/10* (2006.01)

(52) U.S. Cl.
USPC .......................... 348/367; 396/463; 396/495

(58) Field of Classification Search
USPC ..................... 348/367, 368; 396/449–504; 352/204–220
See application file for complete search history.

(56) References Cited

U.S. PATENT DOCUMENTS

| 2004/0170423 A1* | 9/2004 | Kudo et al. | 396/484 |
| 2010/0189431 A1* | 7/2010 | Viglione et al. | 396/463 |
| 2010/0202770 A1* | 8/2010 | Kihara et al. | 396/493 |
| 2011/0069949 A1* | 3/2011 | Huang | 396/468 |

FOREIGN PATENT DOCUMENTS

| KR | 10-0467650 B1 | 1/2005 |
| KR | 10-2006-0109745 A | 10/2006 |
| KR | 10-2009-0017279 A | 2/2009 |

OTHER PUBLICATIONS

Office Action dated Jul. 20, 2011 in Korean Application No. 10-2009-0113520, filed Nov. 23, 2009.
Office Action dated Apr. 23, 2012 in Korean Application No. 10-2009-0135310, filed Dec. 31, 2009.

* cited by examiner

*Primary Examiner* — Lin Ye
*Assistant Examiner* — Mekonnen Dagnew
(74) *Attorney, Agent, or Firm* — Saliwanchik, Lloyd & Eisenschenk

(57) ABSTRACT

A shutter device is disclosed, the device including a base formed with a lens hole through which reflective light from an object passes, a first blade and a second blade rotating about a hinge provided at the base to open or close the lens hole, and an actuator provided with a linearly-shifting slider at an area eccentrically positioned from the hinge to allow the first and second blades to be activated with rotation moment.

6 Claims, 9 Drawing Sheets

SHUTTER DEVICE

CROSS-REFERENCE TO RELATED APPLICATIONS

This application claims the benefit under 35 U.S.C. §119 of Korean Patent Application Nos. 10-2009-0113520, filed Nov. 23, 2009 and 10-2009-0135310, filed Dec. 31, 2009, which are hereby incorporated by reference in their entirety.

BACKGROUND OF THE DISCLOSURE

1. Field of the Invention

The present disclosure relates to a shutter device configured to open and close exposure of a lens in an optical image device such as a camera-embedded mobile device.

2. Discussion of the Related Art

As performances of optical image devices including camera-embedded mobile devices are diversified and become high-ended recently, adoption of a shutter configured to open or shut off exposure of a lens in a conventional camera is needed in earnest. If a shutter is adopted in a camera-embedded mobile device, a high quality image shooting is enabled compared with that of the conventional one, and provides a circumstance in which high-resolution performance in an embedded camera can be properly exhibited.

However, a small-sized mobile device has a disadvantage, for example, of limited installation space and battery consumption, such that miniaturization of shutter device including a shutter and other parts driving the shutter and reduction of driving power are considered as a must in designing the small-sized mobile device.

That is, the conventional shutter device has disadvantages of increased number of parts and complicated operational structure, leading to necessity of non-essential installation space, increased loss in power transfer and increased consumption of battery.

The conventional shutter device has other disadvantages of slow response speed and degraded definition of photographed images, in case a plurality of gears is used or the shutter is operated by complicated link structure, for example, because the shutter device must have an enhanced shutter speed capable of instantly opening or shutting off light reflected from an object.

Meanwhile, the shutter device is operated by electromagnetic force generated from a coil and a magnet, and therefore, needs a restoring unit capable of allowing a shutter to be maintained on a closed position even if the power is not supplied.

BRIEF SUMMARY

The present disclosure is directed to provide a shutter device configured to reduce installation space and consumed power, and to improve response speed by employing a simple power transfer structure.

The present disclosure is also directed to provide a shutter device configured to reduce installation space and consumed power, to improve response speed by employing a simple power transfer structure, to have a high control responsiveness with reduced power consumption by inhibiting leakage of magnetic flux, and to include a restoring unit capable of restoring a shutter to a close position even if power is not provided.

In one general aspect of the present disclosure, there is provided a shutter device, comprising, a base formed with a lens hole through which reflective light from an object passes; a first blade and a second blade rotating about a hinge provided at the base to open or close the lens hole; and an actuator provided with a linearly-shifting slider at an area eccentrically positioned from the hinge to allow the first and second blades to be activated with rotation moment.

In some exemplary embodiments of the present disclosure, the actuator may include the slider formed with a boss coupled to the first and second blades at the area eccentrically positioned from the hinge, a magnet unit attached to the slider and having a first magnetic pole unit and a second magnetic pole unit, each having an opposite polarity, and a stator linearly shifting the slider by providing an electromagnetic force to the magnet unit.

In some exemplary embodiments of the present disclosure, the actuator may include the slider formed with a boss coupled to the first and second blades at the area eccentrically positioned from the hinge, a slider-attached magnet unit in which a multi-pole including the same shaped first and second magnetic pole units is attached to a magnet, and a stator linearly shifting the slider by providing an electromagnetic force to the magnet unit.

In some exemplary embodiments of the present disclosure, the magnet unit may be arranged in a row along a shifting direction of the slider, and the stator may be wound with a coil in a width narrower than that of a total extended length of the magnet unit and fixed at an area lopsided to any one magnetic pole units of first and second magnetic pole units.

In some exemplary embodiments of the present disclosure, the stator may include a coil facing the magnet unit and a core member wrapping the coil, and the core member may include a first lug protruding to a direction of the coil, a pair of second lugs protruding to the other direction of the coil, a connection unit connecting the first lug to the second lug, and a marginal unit extended from a margin of the second lug to a direction of the coil.

In some exemplary embodiments of the present disclosure, the first lug and the connection unit are formed inside the coil, and the second lug and the marginal unit are formed outside of the coil.

In some exemplary embodiments of the present disclosure, a pair of marginal units may be provided, and the pair of marginal units is formed with a discrete distance greater than a total extended length of the magnet unit.

In some exemplary embodiments of the present disclosure, each of the first lug and the second lug may have an electromagnetic force, each electromagnetic force having an opposite polarity.

In some exemplary embodiments of the present disclosure, a separation plate may be formed on an upper surface of the first lug, the first and second magnetic pole units of the magnet unit are arranged in a row on an upper surface of the separation plate, and the linear shifting of the slider is guided by the magnet unit that shifts in a contact state with the separation plate.

In some exemplary embodiments of the present disclosure, the marginal unit may be extended higher than the separation plate, and a shifting span of the slider is restricted by a first contact position and a second contact position contacting a lug of the marginal unit by any one of the first and second magnetic pole units during linear shifting of the slider.

In some exemplary embodiments of the present disclosure, the slider may include a first bending unit and a second bending unit closely contacting a lateral surface of the magnet unit, where the first bending unit shifts in a state of being contacted along a guide formed at the base to thereby guide the slider to linearly shift.

In some exemplary embodiments of the present disclosure, each of the first and second blades may be formed with a stopper hole, where the stopper hole may include a first contact unit corresponding to one inner lateral wall of the stopper hole and a second contact unit corresponding to the other inner lateral wall of the stopper hole, a stopper may be protruded from a part of the base exposed by the stopper hole, where the stopper may include a close unit corresponding to an outer lateral wall of the stopper and an open unit corresponding to the other outer lateral wall of the stopper, a closed position of the first and second blades is defined by contact between the first contact unit and the close unit during closing operation of the first and second blades, and an open position of the first and second blades is defined by contact between the first contact unit and the close unit during opening operation of the first and second blades.

In another general aspect of the present disclosure, there is provided a shutter device, comprising: a base formed with a lens hole; first and second blades rotating about a hinge provided at the base, and rotating to a position closing the lens hole and to a position opening the lens hole; and an actuator including a magnet unit and a coil generating a rotation moment for the first and second blades, and a restoring unit restoring the first and second blades to a closed position in a case the coil is not supplied with power.

In some exemplary embodiments of the present disclosure, the actuator may include a slider and a yoke member, where the slider may include a boss coupled to the first and second blades at an area eccentrically positioned from the hinge, may be attached to the magnet unit to linearly shift along with the magnet unit and to provide a rotation moment to the first and second blades through the boss, and the yoke member of magnetic substance may be arranged at the periphery of the coil to inhibit the electromagnetic force from being leaked out.

In some exemplary embodiments of the present disclosure, the actuator may include a slider and a yoke member, and the yoke member may include a first lug, a second lug and a third lug, where the first, second and third lugs may be so arranged as to allow a magnetic force acting on the first, second, third lugs and the magnet unit to be eccentrically effected to one side relative to the linearly shifting direction of the slide, whereby a restoring force to the close direction can be worked on the slider.

In some exemplary embodiments of the present disclosure, the actuator may include a slider and a yoke member, and the yoke member may include a first lug, a second lug and a third lug, where the coil passes a discrete space formed between the first and second lugs, and is wound in the shape of a hollow pillar passing a discrete space formed between the first and third lugs, and the second lug arranged between the first and third lugs is arranged closer to any one of the first and third lugs such that the slider is applied with a restoring force to the close direction.

In some exemplary embodiments of the present disclosure, the actuator may include a slider and a yoke member, and yoke member may include a flat type body unit, a first lug formed by bending one side of the body unit and a third lug formed by bending the other side of the body unit, an opening unit in which a part of the body unit corresponding to a gap between the first lug and the third lug is opened, and a second lug formed by bending a margin of the opening unit to face the first lug across the part of the body unit.

In some exemplary embodiments of the present disclosure, the actuator may include a slider and a yoke member, and the yoke member may include a first lug, a second lug and a third lug, where the first and third lugs may be arranged outside of the coil, while the second lug may be arranged inside the coil and positioned at an area lopsided to any one lug of the first and third lugs.

In some exemplary embodiments of the present disclosure, the actuator may include a slider and a yoke member, and the slider may include a first bending unit and a second bending unit attached to a lateral surface of the magnet unit, where the first bending unit may allow the slider to be guided in a linear shift by shifting along a guide formed at the base in a contacted state.

In still another general aspect of the present disclosure, a shutter device is provided, the shutter device comprising: first and second blades rotating to a close position closing a lens hole formed at a base and to an open position opening the lens hole; a magnet unit and a coil generating a rotation moment of the first and second blades; stopper holes each formed at the first blade and the second blade, and including a first contact unit corresponding to one inner lateral wall and a second contact unit corresponding to the other inner lateral wall; and a stopper protruded from a part of the base exposed by the stopper hole, and including a close unit corresponding to one outer lateral wall and an open unit corresponding to the other outer lateral wall, where the close position of the first and second blades is defined by allowing the close unit and the first contact unit to be contacted during close operation of the first and second blades, and the open position of the first and second blades is defined by allowing the open unit and the second contact unit to be contacted during open operation of the first and second blades.

In still another general aspect of the present disclosure, a shutter device is provided, the shutter device comprising: first and second blades rotating to a close position closing a lens hole and to an open position opening the lens hole; a coil generating an electromagnetic force when power is applied; a magnet unit linearly moving by being faced with the coil; a slider coupled to the magnet unit and protruded by a boss, and providing a rotation moment to the first and second blades by allowing the boss to be inserted into a boss hole oblongly provided at the first and second blades; and a yoke member of magnetic substance arranged at a periphery of the coil to inhibit the electromagnetic force from being leaked, where the yoke member provides a magnetic force facing the close direction to the first and second blades when the coil is not provided with power.

The present disclosure thus configured is advantageous in that installation space and consumed power can be reduced, and response speed can be improved by employing a simple power transfer structure.

The present disclosure thus configured is advantageous in that installation space and consumed power can be reduced, response speed can be improved by employing a simple power transfer structure, high control responsiveness can be obtained with reduced power consumption by inhibiting leakage of magnetic flux, and a restoring unit capable of restoring a shutter to a close position can be included even if power is not provided.

BRIEF DESCRIPTION OF THE DRAWINGS

The accompanying drawings, which are included to provide a further understanding of the present disclosure and which are incorporated in and constitute a part of this application, and together with the description serve to explain the principle of the disclosure. In the drawings.

DETAILED DESCRIPTION

Figure 1:
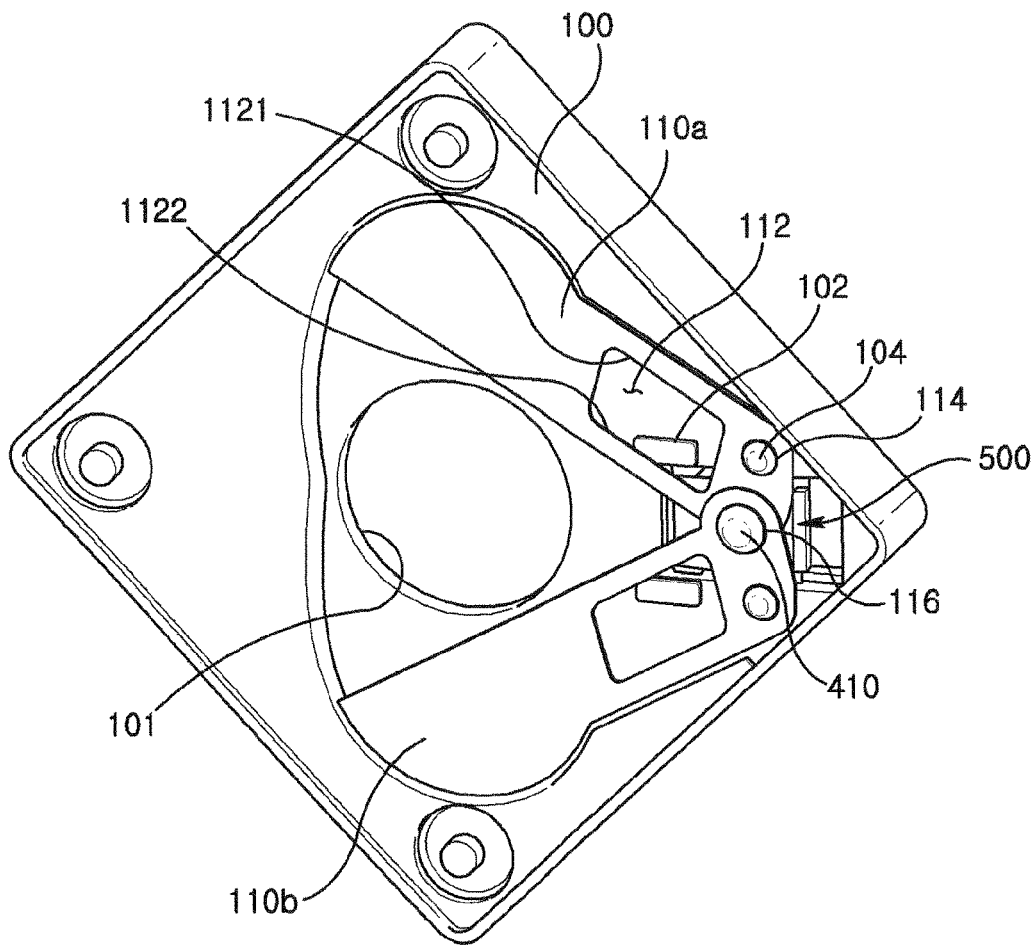
FIG. 1 is a perspective view illustrating a shutter device according to the present disclosure.

Advantages and features of the present disclosure accomplishing the same may be understood more readily by reference to the following detailed description of exemplary embodiments and the accompanying drawings.

Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated for the sake of convenience. Furthermore, throughout the descriptions, the same reference numerals will be assigned to the same elements in the explanations of the figures, and explanations that duplicate one another will be omitted.

First Embodiment

Figure 2:
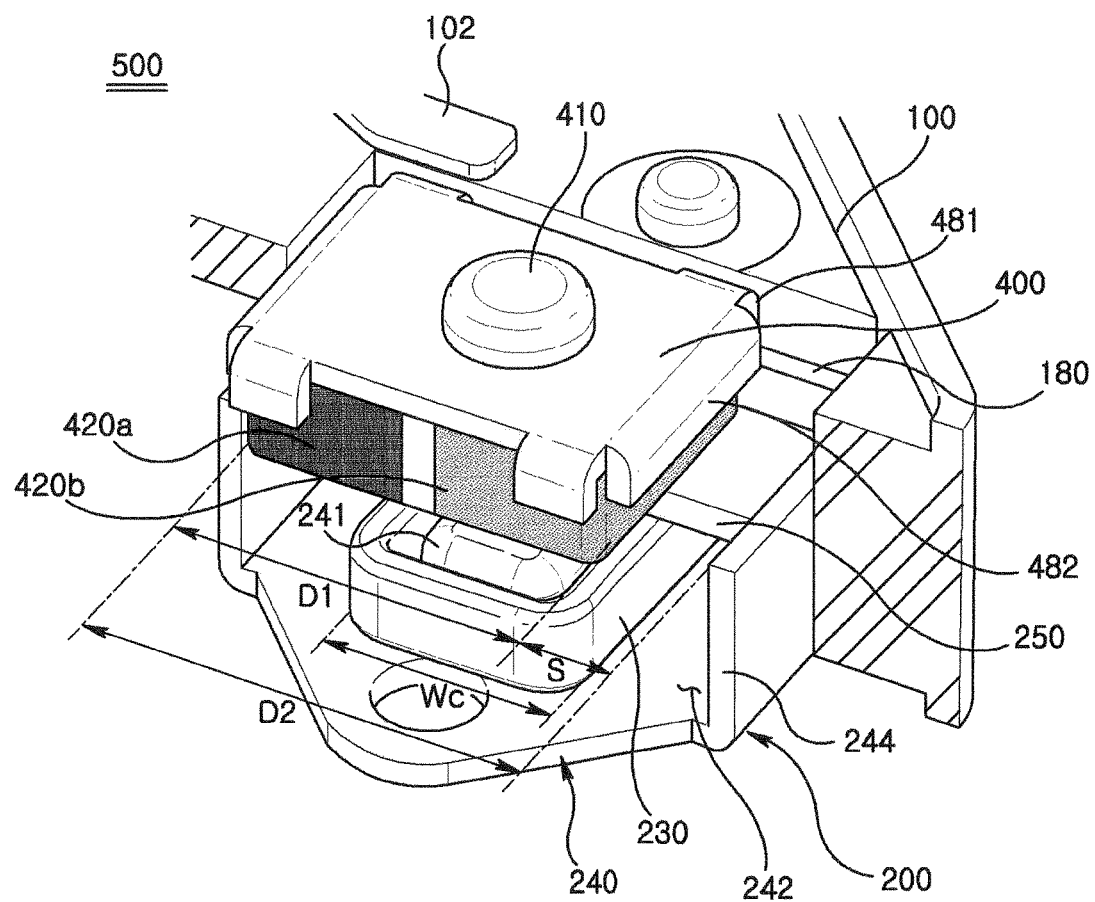
FIG. 2 is a partial perspective view illustrating in detail an actuator of a shutter device according to the present disclosure.
Figure 3:
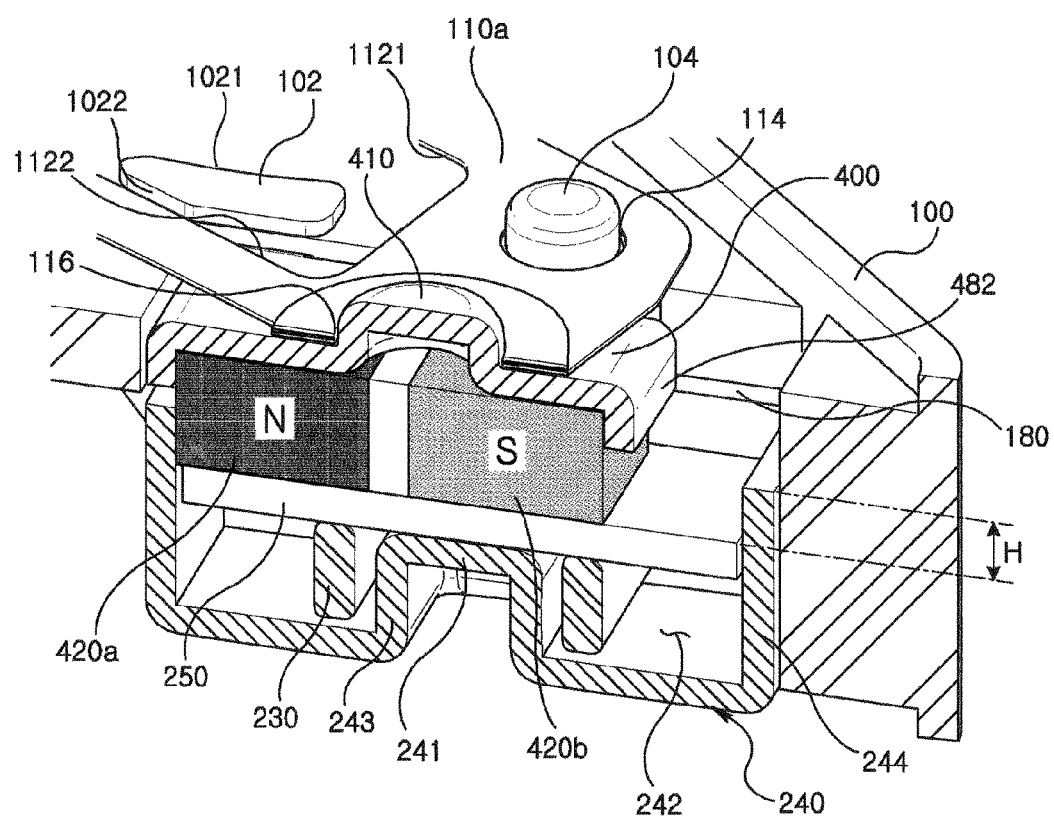
FIG. 3 is a perspective view illustrating a shutter device in which first and second blades are located at an open position according to a first exemplary embodiment of the present disclosure.
Figure 4:
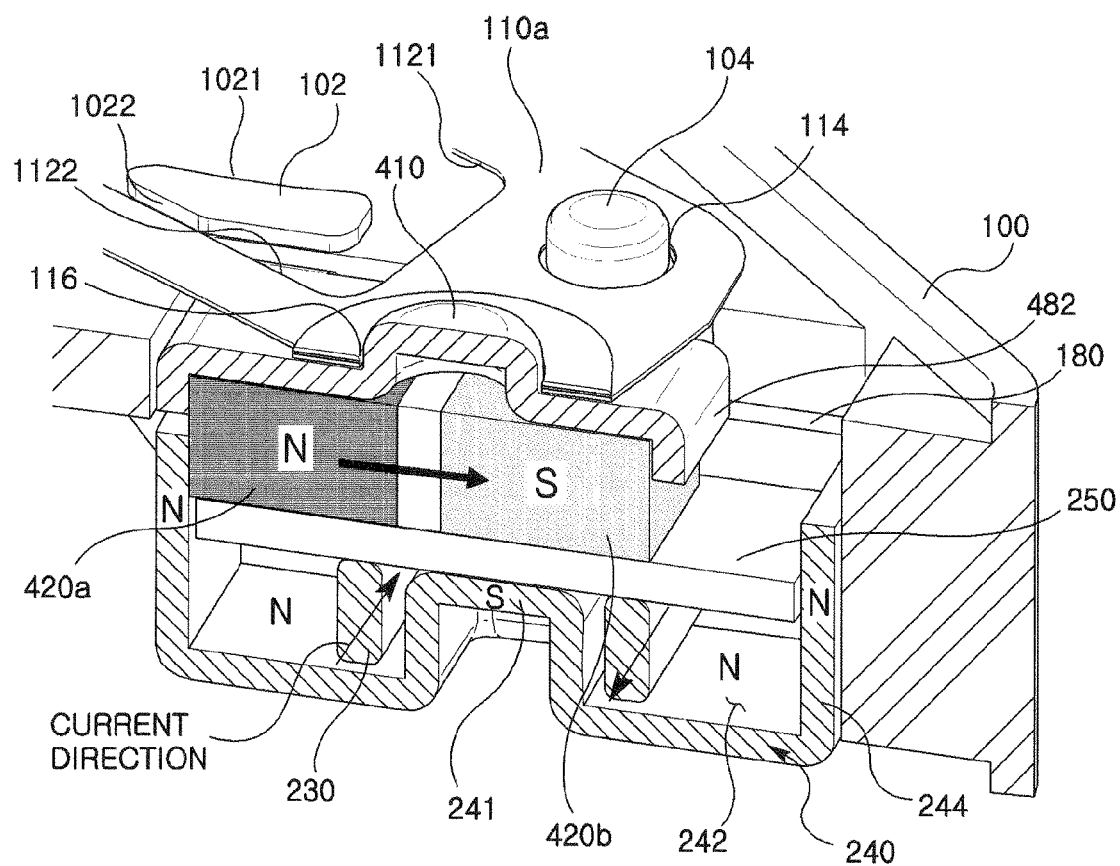
FIG. 4 is a perspective view illustrating a shutter device at a time when a close operation starts according to an exemplary embodiment of the present disclosure.
Figure 5:
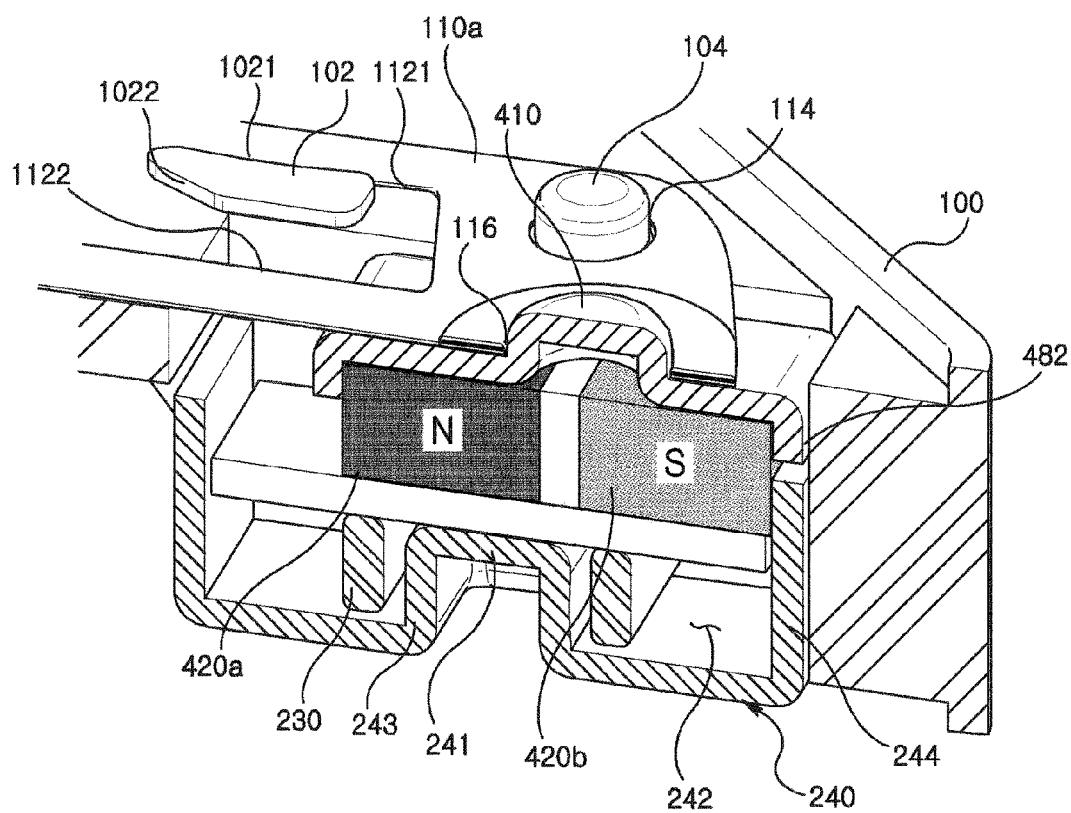
FIG. 5 is a perspective view illustrating a shutter device in which first and second blades are located at a close position according to a first exemplary embodiment of the present disclosure.
Figure 6:
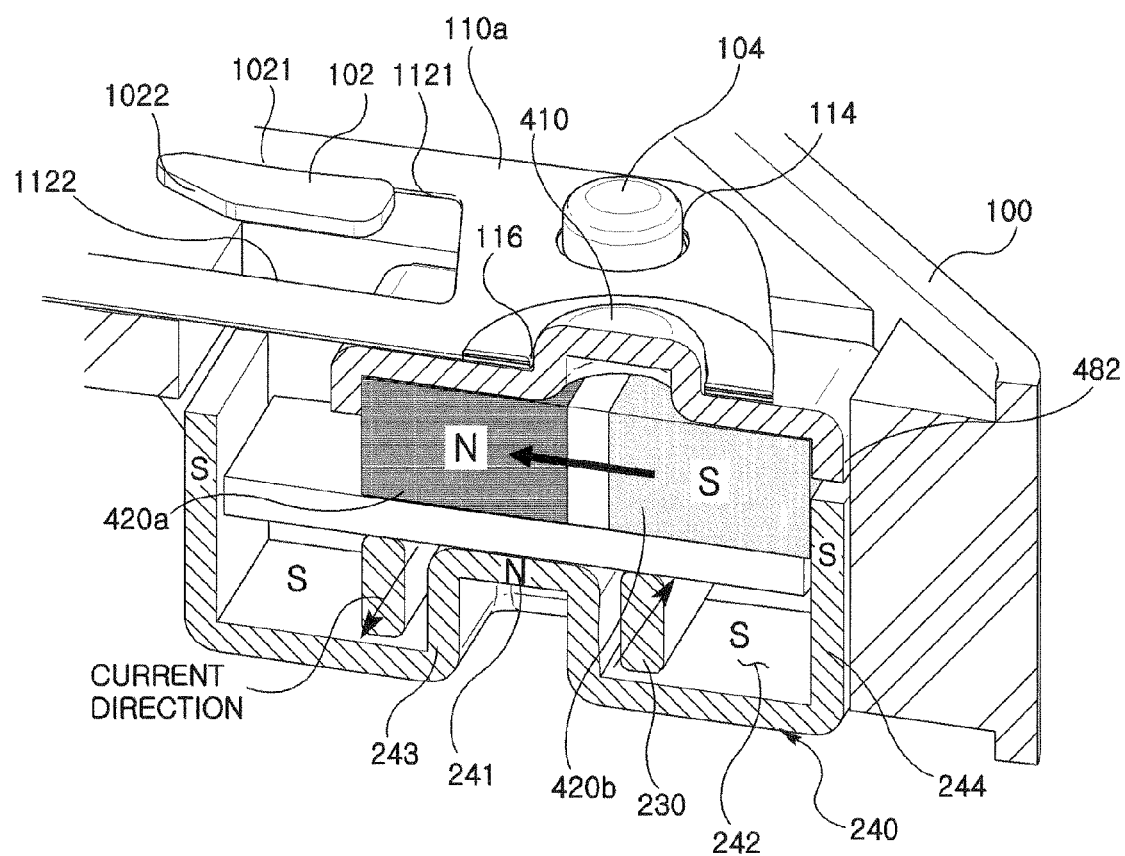
FIG. 6 is a perspective view illustrating a shutter device at a time when an open operation starts according to an exemplary embodiment of the present disclosure.

FIG. 1 is a perspective view illustrating a shutter device according to the present disclosure, FIG. 2 is a partial perspective view illustrating in detail an actuator of a shutter device according to the present disclosure, FIG. 3 is a perspective view illustrating a shutter device in which first and second blades are located at an open position according to a first exemplary embodiment of the present disclosure, FIG. 4 is a perspective view illustrating a shutter device at a time when a close operation starts according to an exemplary embodiment of the present disclosure, FIG. 5 is a perspective view illustrating a shutter device in which first and second blades are located at a close position according to a first exemplary embodiment of the present disclosure, and FIG. 6 is a perspective view illustrating a shutter device at a time when an open operation starts according to an exemplary embodiment of the present disclosure.

Now, the configuration and operation of the shutter device according to the present disclosure will be described in detail with reference to FIGS. 1 through 6.

The shutter device according to the present disclosure may be mounted in a small-sized optical image device including a camera-embedded mobile device, for example, and may open or close a lens hole (101) which is an incident passage of light relative to a lens.

The shutter device may include a base (100) formed with a lens hole (101) through which reflective light from an object passes; a first blade and a second blade (110a, 110b) rotating about a hinge provided at the base to open or close the lens hole (101); and an actuator (500) driving the base and the first blade and the second blade (110a, 110b).

The base (100) constitutes a framework of the shutter device and is attachably and detachably mounted to an optical image device via a fastening member. The base (100) may be formed with the lens hole (101) through which light from an object passes. In a case the shutter device is coupled to an optical image device, the lens hole (101) may face a lens group of the optical image device.

The first and second blades (110a, 110b) may open or close the lens hole (101). In the present exemplary embodiment, the first and second blades (110a, 110b) may rotate about a hinge (104) provided at the base. A driving force for rotating the first and second blades (110a, 110b) may be provided by the actuator (500). The actuator (500) may adopt an air pressure cylinder or a servo motor but may take a driving method of combining a coil (230) and a magnet unit (420) in order to miniaturize the shuttle device and to reduce the power consumption.

Furthermore, the shutter device according to the present exemplary embodiment is structured in such a manner that a slider (400) that provides a rotation moment to the first and second blades (110a, 110b) linearly shifts, whereby the number of parts in a power transfer device can be greatly reduced and as a result, an accurate position control by the blades (110a, 110b) can be implemented. That is, the slider (400) linearly shifts at an area eccentrically positioned from a hinge (104) of the base (100) in order to provide a rotation moment to the first and second blades (110a, 110b).

To be more specific, the actuator (500) may include the slider (400), a magnet unit (420) in which a multi-pole including first and second magnetic pole units (420a, 420b) is magnetically attached, and a stator (200).

The slider (400) is coupled to the first and second blades (110a, 110b) at an area eccentrically positioned from the hinge (104). Hinge holes (114) respectively formed at the first and second blades (110a, 110b) are loosely inserted by the hinge (104) for rotation. A boss (410) protruded on an upper surface of the slider (400) is loosely inserted into a boss hole (116) punched through the first and second blades (110a, 110b) to restrain the frictional resistance.

The magnet unit (420) may be exemplified in various ways. For example, one magnet may be magnetically attached with several magnetic poles including the first magnetic pole unit (420a) and the second magnetic pole unit (420b), and independent magnets may be magnetically attached with the first magnetic pole unit (420a) and the second magnetic pole unit (420b) where the plurality of independent magnets are arranged in a row. Furthermore, separate magnetic poles other than the first magnetic pole unit (420a) and the second magnetic pole unit (420b) may be formed to provide three or more different magnetic poles at the magnet unit (420).

Each of the first magnetic pole unit (420a) and the second magnetic pole unit (420b) may have an opposite polarity, and may be formed in a row along a linear shifting direction of the slider (400). First and second bending units (481, 482) formed by bending the slider (400) downwardly tightly fix the slider (400) to the magnet unit (420) including the first magnetic pole unit (420*a*) and the second magnetic pole unit (420*b*).

A stator (200) may linearly shift the slider (400) by providing an electromagnetic force to the first magnetic pole unit (420*a*) and the second magnetic pole unit (420*b*). The stator (200) may include a coil (230) facing the magnet unit (420) including the first magnetic pole unit (420*a*) and the second magnetic pole unit (420*b*), and a core member (240) wrapping the coil (230).

The first magnetic pole unit (420*a*) and the second magnetic pole unit (420*b*) as structures for linearly shifting the slider (400) may be arranged in a row along a shifting direction of the slider (400). Furthermore, the coil (230) may be wound in a width narrower than that of a total extended length of the magnet unit (420) and fixed at an area lopsided to any one stimulating units of first and second magnetic pole units (420*a*, 420*b*). Therefore, a large number of link parts for power transfer may be dispensed with to easily obtain a linear mobility towards one direction and opposite direction.

A core member (240) may include a first lug (241), a pair of second lugs (242), a connection unit (243) and a marginal unit (244). The first lug (241) is protruded to one direction of the core (230) and faces the magnet unit (420) including the first magnetic pole unit (420*a*) and the second magnetic pole unit (420*b*) across a separation plate (250). The second lug (242) is protruded to the other direction of the core (230) and has an electromagnetic force having a polarity opposite to that of the first lug (241) in a case the coil (230) is applied with power.

The first and second lugs (241, 242) are not separate parts but formed from a single flat plate that is bent. Therefore, it is possible to reduce a dimensional tolerance of component parts and a manufacturing cost. The connection unit (243) is a component part that connects the first lug (241) to the second lug (242), the lugs (241, 242) being provided on a single part.

The first lug (241) and the connection unit (243) may be located inside the coil (230), while the second lug (242) and the marginal unit (244) may be located outside of the coil (230). Meanwhile, a pair of marginal units (244) may be provided to apply a greater electromagnetic force to the first and second magnetic pole units (420*a*, 420*b*) and to regulate a shifting span (S) of the first and second magnetic pole units (420*a*, 420*b*).

The pair of marginal units (244) may be extended from the marginal unit (244) of the second lug (242) to one lateral direction of the coil (230) to provide a greater electromagnetic force to the first and second magnetic pole units (420*a*, 450*b*), whereby the power consumption can be reduced. The pair of marginal units (244) may be formed with a discrete distance (D2) greater than a total extended length (D1) of the magnet unit (420) including the first and second magnetic pole units (420*a*, 420*b*). Therefore, the shifting span (S) of the slide (400) is a value in which a length of the marginal unit (244) is subtracted by a total extended length of the magnet unit (420) including the first and second magnetic pole units (420*a*, 420*b*).

Furthermore, a separation plate (250) may be formed on an upper surface of the first lug (241). The upper surface of the separation plate (250) may be arranged in a row with the magnet unit (420) including the first and second magnetic pole units (420*a*, 420*b*). At this time, the marginal unit (244) may be extended higher than the separation plate (250). There is an advantage of adjusting the shifting speed of the slider (400), and response speed of the first and second blades (1101, 110*b*), if a sill height (H) of the marginal unit (244) relative to the separation plate (250).

As a result, a shifting span (S) of the slider (400) is restricted by a first contact position and a second contact position contacting a lug of the marginal unit (244) by any one of the first and second magnetic pole units (420*a*, 420*b*) during linear shifting of the slider. Furthermore, in a case the coil (230) is not supplied with power, the slider (400) maintains the close position or open position despite external force such as impact to the marginal unit (244).

Meanwhile, means for guiding the linear shift of the slider (400) coupled to the magnet unit (420) including the first and second magnetic pole units (420*a*, 420*b*) may be provided. In the present exemplary embodiment, the magnet unit (420) including the first and second magnetic pole units (420*a*, 420*b*) is shifted in a state of being contacted to the separation plate (250), whereby the linear shift of the slider (400) can be guided.

Furthermore, the slider may include a first bending unit (481) and a second bending unit (482) closely contacting a lateral surface of the magnet unit (420), where the first bending unit shifts in a state of being contacted along a guide (180) formed at the base (100) to thereby guide the slider (400) to linearly shift.

The repeatability of open position opening, by the first and second blades (1101, 110*b*), the lens hole (101) and close position closing, by the first and second blades (1101, 110*b*), the lens hole (101) may be also accomplished by a stopper (102) and a stopper hole (112).

That is, each of the first and second blades (110*a*, 110*b*) may be formed with the stopper hole (112), where the stopper (102) may be protruded from a part of the base (100) exposed by the stopper hole (112). The stopper hole (112) may include a first contact unit (1121) corresponding to one inner lateral wall of the stopper hole (112) and a second contact unit (1122) corresponding to the other inner lateral wall of the stopper hole (112), where the stopper (102) may include a close unit (1021) corresponding to an outer lateral wall of the stopper (102) and an open unit (1022) corresponding to the other outer lateral wall of the stopper (102). At this time, a closed position of the first and second blades (110*a*, 110*b*) is defined by contact between the first contact unit (1121) and the close unit (1021) during closing operation of the first and second blades (110*a* 110*b*), and an open position of the first and second blades (110*a* 110*b*) is defined by contact between the first contact unit and the close unit during opening operation of the first and second blades (110*a* 110*b*).

Now, operation of the shutter device will be described with reference to FIGS. 3 through 6.

Referring to FIG. 3, the first blade (110*a*) is positioned at the open position under a locked state.

In a case the first magnetic pole unit (420*a*) is closed contacted to the marginal unit (244), which is called a first contact position, the first blade (110*a*) is made to rotate no longer, whereby the open position of the first blade (110*a*) is restricted.

In another exemplary embodiment, in a case the second contact unit (1122) of the stopper hole (112) is closely contacted to the open unit (1022) of the stopper (102), the first blade (110*a*) is made to rotate no longer, whereby the open position of the first blade (110*a*) is restricted.

Meanwhile, regardless of supply of power to the coil (230), the shaking of the slider (400) is restricted by suction magnetic force generated by the first magnetic pole unit (420*a*) and the core member (240), or by suction magnetic force generated by the second magnetic pole unit (420*b*) and the core member (240). Therefore, the slider (400) and the first blade (110a) can maintain a predetermined position despite the external force including shock.

FIG. 4 illustrates a state in which the first blade (110a) starts to close with the open position as an initial position, where an arrow shows a direction of the current being applied to the coil (230). Based on the Fleming's left hand rule, the slide (400) may receive an electromagnetic force shifting to a close position which is a right hand direction, whereby the first blade (110a) starts to rotate to a position closing the lens hole (101).

FIG. 5 illustrates the first blade (110a) being locked at the close position. In a case the second magnetic pole unit (420b) comes to be closely contacted to the marginal unit (244), which is called a second contact position, the first blade (110a) is made to rotate to the right side no longer, whereby the close position of the first blade (110a) is restricted.

Likewise, in a case the first contact unit (1121) of the stopper hole (112) is closely contacted to the close unit (1021) of the stopper (102), the first blade (110a) is made to rotate no longer, whereby the close position of the first blade (110a) is restricted.

Meanwhile, regardless of supply of power to the coil (230), the shaking of the slider (400) is restricted by suction magnetic force generated by the first and second magnetic pole units (420a, 420b) and the core member (240), whereby the slider (400) can maintain the close position despite the external force.

FIG. 6 illustrates a state in which the first blade (110a) starts to open with the close position as an initial position, where an arrow shows a direction of the current being applied to the coil (230). Based on the Fleming's left hand rule, the slide (400) may receive an electromagnetic force shifting to an open position which is a left hand direction, whereby the first blade (110a) starts to rotate to a position opening the lens hole (101).

Meanwhile, the shift speed of the shutter device reciprocating between the open position and the close position may be adjusted by adjusting various design variables including intensity of current applied to the coil (230), magnetized capacities of the first and second magnetic pole units (420a, 420b), increase and decrease of area facing the coil (230), a degree of protrusion of the marginal unit (244), a degree of lubrication to the separation plate (250) and material of the core member (240).

For example, adjustment of intensity of current applied to the core (230) can simply adjust the response speed of the shutter device in an accurate resolution. At this time, unlike the prior art, the power transfer formed at the actuator (500) and the number of parts for shift direction change can be greatly reduced to dispense with load generation resultant from clearances or movements between parts, thereby reducing the power consumption, whereby reliability and durability of the shutter device can be expectedly improved.

Second Embodiment

Figure 7:
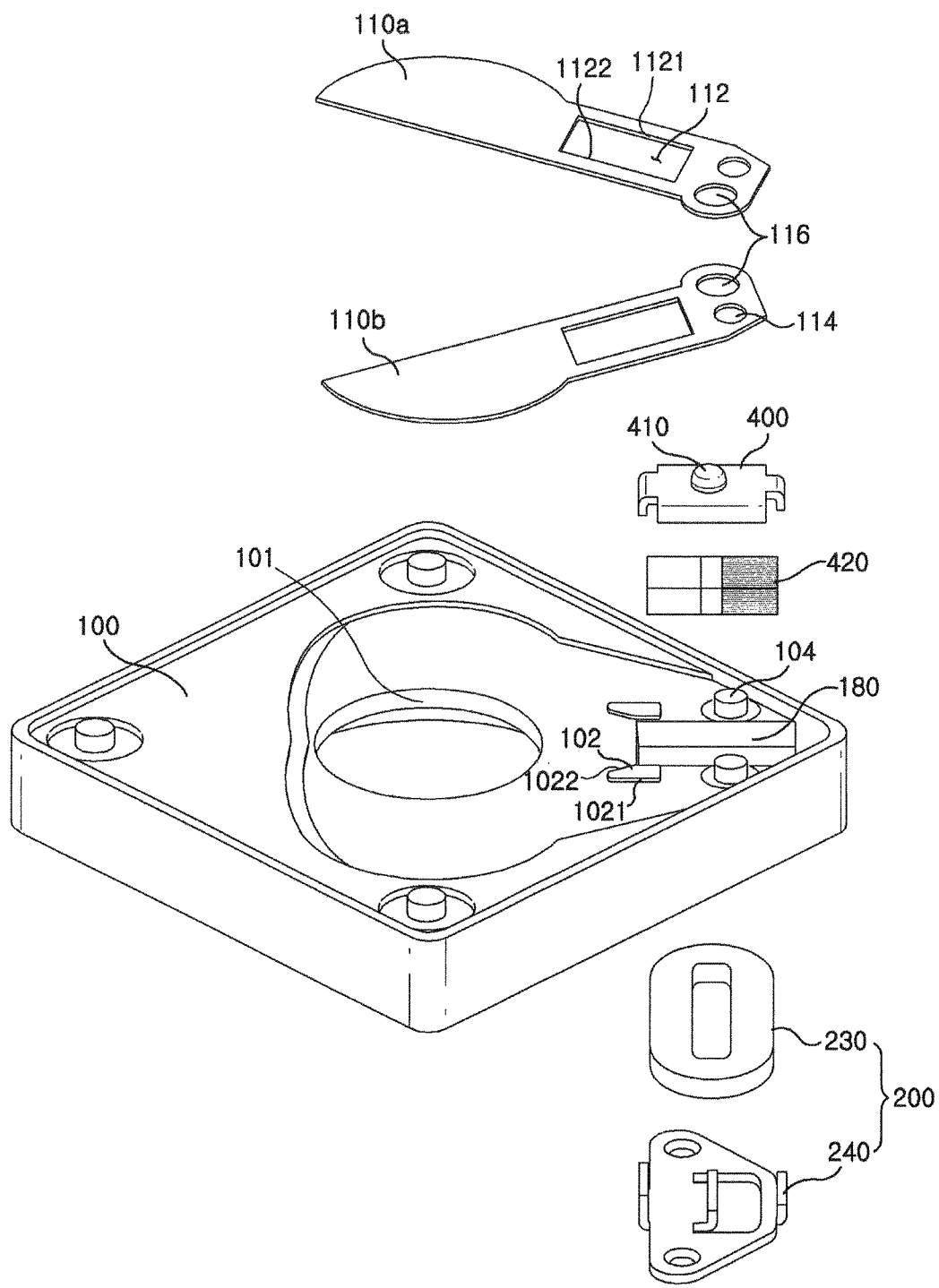
FIG. 7 is an exploded perspective view of a shutter device according to the present disclosure.
Figure 8:
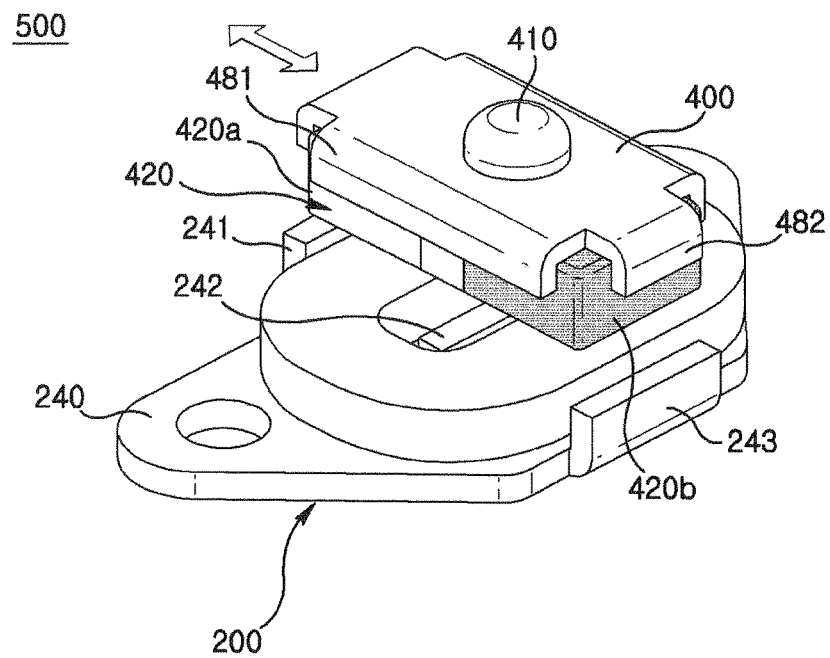
FIG. 8 is a perspective view illustrating an actuator according to the present disclosure.
Figure 9:
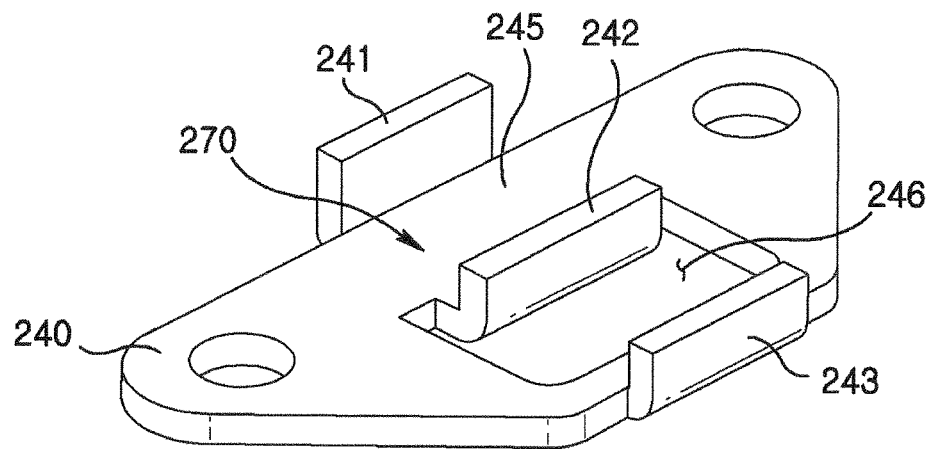
FIG. 9 is a perspective view illustrating a yoke member according to the present disclosure.
Figure 10:
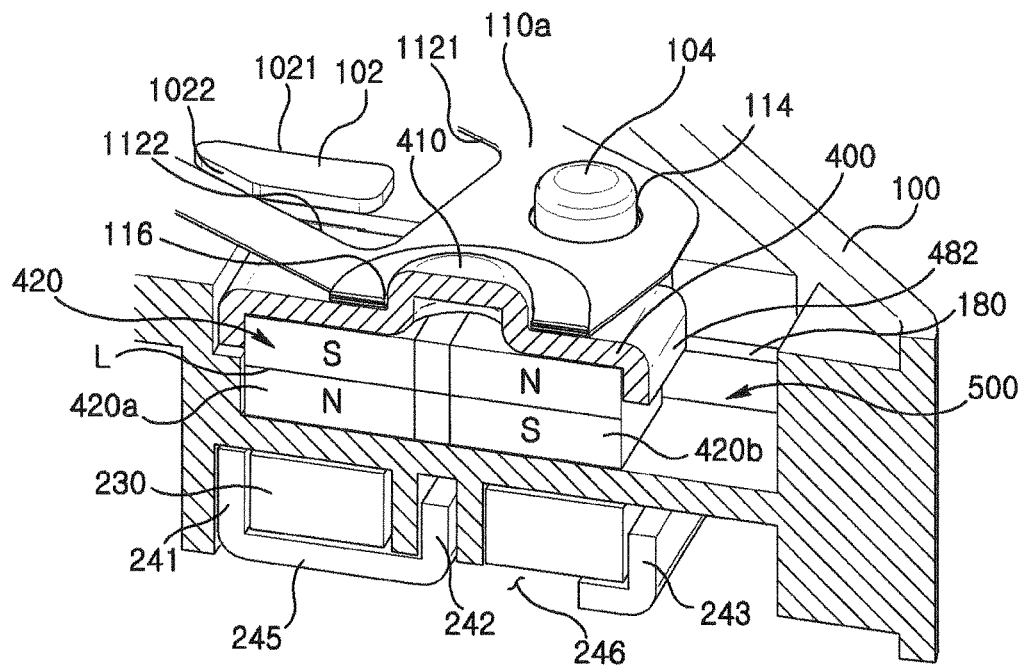
FIG. 10 is a cut-out perspective view illustrating a state of a shutter member maintaining a close position prior to power supply.
Figure 11:
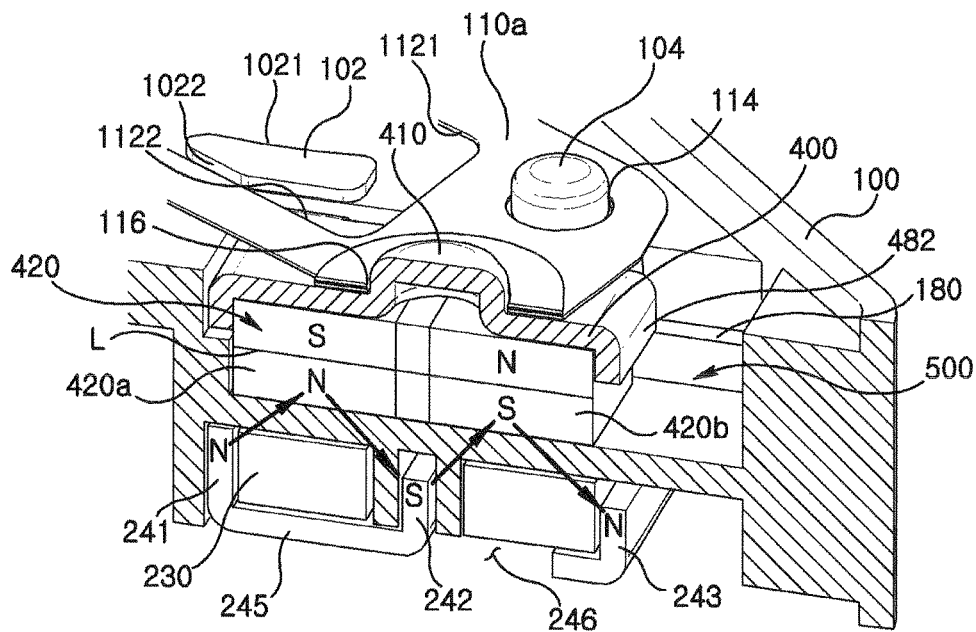
FIG. 11 is a cut-out perspective view illustrating an electromagnetic force that acts on when the power is just provided under the state of FIG. 10.

FIG. 7 is an exploded perspective view of a shutter device according to the present disclosure, FIG. 8 is a perspective view illustrating an actuator according to the present disclosure, FIG. 9 is a perspective view illustrating a yoke member according to the present disclosure, FIG. 10 is a cut-out perspective view illustrating a state of a shutter member maintaining a close position prior to power supply, and FIG. 11 is a cut-out perspective view illustrating an electromagnetic force that acts on when the power is just provided under the state of FIG. 10.

The shutter device according to the present disclosure may be installed on a small-sized optical image device including, for example, a camera-embedded mobile device, and open or close a lens hole (101) which is a light incident passage relative to a lens.

The shutter device may include may include a base (100) formed with a lens hole (101), a first blade and a second blade (110a, 110b) to open or close the lens hole (101), and an actuator (500) driving the base (100) and the first blade and the second blade (110a, 110b).

The base (100) constitutes a framework of the shutter device and is attachably and detachably mounted to an optical image device via a fastening member. The base (100) may be formed with the lens hole (101) through which light from an object passes. In a case the shutter device is coupled to an optical image device, the lens hole (101) may face a lens group (not shown) of the optical image device.

The first and second blades (110a, 110b) may rotate an open position to open the lens hole (101) or to a close position to close the lens hole (101). To this end, the first and second blades (110a, 110b) may rotate about a hinge (104) provided at the base (100). A driving force for rotating the first and second blades (110a, 110b) may be provided by the actuator (500). The actuator (500) may adopt an air pressure cylinder or a servo motor but may take a driving method of combining a coil (230) with a magnet unit (420) in order to miniaturize the shuttle device and to reduce the power consumption.

Furthermore, the shutter device according to the present exemplary embodiment is structured in such a manner that a slider (400) that provides a rotation moment to the first and second blades (110a, 110b) linearly shifts, whereby the number of parts in a power transfer device can be greatly reduced and as a result, an accurate position control by the blades (110a, 110b) can be implemented. That is, the slider (400) linearly shifts at an area eccentrically positioned from a hinge (104) of the base (100) in order to provide a rotation moment to the first and second blades (110a, 110b).

To be more specific, the actuator (500) may include the slider (400), a magnet unit (420) including first and second magnetic pole units (420a, 420b), and a stator (200). The first magnetic pole unit (420a) may be formed with a polarization line (L), for example, to which only one N pole and only one S pole are magnetically attached. Various other exemplary embodiments may be implemented. For example, the first magnetic pole unit (420a) may be lengthwise or crosswise formed with a plurality of polarization lines to be partitioned into a plurality of magnetic regions to which a plurality of S poles and N poles are magnetically attached, whereby magnetic force can be reinforced and control accuracy can be enhanced.

A boss (410) protruded from the slider (400) may be coupled to the first and second blades (1101, 110b) at an area eccentrically positioned from the hinge (104). The hinge holes (114) punched into the first and second blades (110a, 110b) are loosely and rotatably inserted by the hinge (104). The boss (410) protruded from an upper surface of the slider (400) is loosely inserted into the boss holes (116) punched into the first and second blades (110a, 110b) to thereby restrict the frictional resistance. The rotation moment is transferred to the first and second blades (110a, 110b) through the coupled structure between the boss (410) and the boss hole (116) when the slider (400) linearly shifts.

In the exemplary embodiment, the boss hole (116) takes an oblong shape extended to an inclination relative to the linear shifting direction of the slider (400) and the boss (410). Each of the boss holes (116) is provided at the first and second blades (110a, 110b), where, because the first and second blades (110a, 110b) respectively rotate in opposite directions, the boss hole (116) respectively formed on the first and second blades (110a, 110b) are extended to a cross direction.

That is, in a case the boss (410) linearly shifts towards the open position based on the hinge (104) of rotating center, a shifting trace (i.e., moving trajectory) of the boss (410) is gradually distanced from the hinge (104). In contrast, in a case the boss (410) linearly shifts towards the close position based on the hinge (104) of rotating center, a shifting trace of the boss (410) gradually approaches the hinge (104). As noted, the shifting trace is distanced from the hinge (104), or approaches the hinge (104), such that the oblong boss hole (116) is so designed as to have a shape and a tolerance, whereby the boss (410) is inhibited from being caught in the boss hole (116) not to interfere movement of the boss in the boss hole by calculating a relative distance changed by the hinge (104) and the boss (410). The boss (410) slides along a lateral wall of the boss hole (116) in a case the slide (400) linearly shifts.

The magnet unit (420) may be exemplified in various ways. For example, one magnet may be magnetically attached with several magnetic poles including the first magnetic pole unit (420a) and the second magnetic pole unit (420b), and independent magnets may be magnetically attached with the first magnetic pole unit (420a) and the second magnetic pole unit (420b) where the plurality of independent magnets are arranged in a row. Furthermore, separate magnetic poles other than the first magnetic pole unit (420a) and the second magnetic pole unit (420b) may be formed to provide three or more different magnetic poles at the magnet unit (420).

Each of the first magnetic pole unit (420a) and the second magnetic pole unit (420b) may have an opposite polarity, and may be formed in a row along a linear shifting direction of the slider (400). First and second bending units (481, 482) formed by bending the slider (400) downwardly tightly fix the slider (400) to the magnet unit (420) including the first magnetic pole unit (420a) and the second magnetic pole unit (420b).

A stator (200) may linearly shift the slider (400) by providing an electromagnetic force to the first magnetic pole unit (420a) and the second magnetic pole unit (420b). The stator (200) may include a coil (230) facing the magnet unit (420) including the first magnetic pole unit (420a) and the second magnetic pole unit (420b), and a core member (240) wrapping the coil (230).

The first magnetic pole unit (420a) and the second magnetic pole unit (420b) as structures for linearly shifting the slider (400) may be arranged in a row along a shifting direction of the slider (400). A yoke member (240) is arranged about the coil (230) to inhibit the electromagnetic force of the coil from being leaked. In order to inhibit the electromagnetic force of the coil, it is preferable that the yoke member (240) is formed with magnetic substance. The yoke member (240) is structurally formed with a restoring unit (270) for restoring the first and second blades (110a, 110b) to the close position. To this end, the yoke member may include a first lug (241), a second lug (242) and a third lug (243), where the first, second and third lugs may be so arranged as to allow a magnetic force acting on the first, second, third lugs and the magnet unit to be eccentrically effected to one side relative to the linearly shifting direction of the slide (400), whereby a restoring force to the close direction can be worked on the slider by the magnetic force generated by the yoke member (240) and the magnet unit (420) when the coil (230) is not applied with power.

The coil (230) passes a discrete space between the first and second lugs (241, 242) and is wound in the shape of a hollow pillar passing the discrete space formed by the first and second lugs (241, 242). At this time, the second lug (242) arranged between the first and third lugs (241, 243) may be arranged closer to any one lug of the first and third lugs (241, 243) to allow the restoring force to close position to be worked on the slider (400).

To be more specific in describing the yoke member (240), the yoke member (240) may include a flat type body unit (245), a first lug (241) formed by bending one side of the body unit (245) and a third lug (243) formed by bending the other side of the body unit (245), an opening unit (246) in which a part of the body unit (245) corresponding to a gap between the first lug (241) and the third lug (243) is opened, and a second lug (242) formed by bending a margin of the opening unit (246) to face the first lug (241) across the part of the body unit (245). The first and third lugs (241, 243) may be arranged outside of the coil (230), while the second lug (242) may be arranged inside the coil (230) and positioned at an area lopsided to any one lug of the first and third lugs (241, 243).

According to the structural arrangement, the second lug (242) is positioned closer to the first lug (242), such that the magnetic force can be worked on the close direction. The structural arrangement can be variably changed according to which direction is a close direction and which direction being an open direction.

The first, second and third lugs (241, 242, 243) are formed, not from separate parts but from the same flat single body unit (245) that is bent, whereby the part tolerance and manufacturing cost can be reduced. A discrete space formed by the first and second lugs (241, 242) is connected to a part of the body unit (245), and the open unit (246) is positioned at a discrete space formed by the second and third lugs (242, 243). The adjustment of structures and shapes of the first, second and third lugs (241, 242, 243), discrete distances thereamong, a height protruding toward the coil, and a distance to the magnet unit can advantageously adjust the shifting speed of the slider (400), the shiftable scope of the slider (400) and the response speeds of the first and second blades (110a, 110b).

Meanwhile, means may be provided for guiding the linear shift of the slider (400) coupled by the magnet unit (420) including the first magnetic pole unit (420a) and the second magnetic pole unit (420b), whereby the magnet unit (420) including the first and second magnetic pole units (420a, 420b) moves in a state of being contacted to a guide (180) to thereby guide the linear shift of the slider (400).

Therefore, a shiftable span (S) of the slide (400) is restricted by a first contact position (which corresponds to the position of the magnet unit (420) in FIGS. 10 and 11) contacting a protruded portion of the guide (180) by any one of the first and second magnetic pole units (420a, 420b) and by a second contact position (which corresponds to a position opposite to the first contact position). Furthermore, a square grooved wall about the guide (180) and the guide (180) can maintain the close position or the open position of the slider (400) despite the application of external shock.

Meanwhile, the slider (400) may include a first bending unit (481) and a second bending unit (482) attached to a lateral surface of the magnet unit including the first and second magnetic pole units (420a, 420b), where the first bending unit (481) may allow the slider to be guided in a linear shift by shifting along the guide (180) formed at the base (100) in a contacted state, whereby the slider (400) is guided for the linear shift.

Meanwhile, repeatability of open position opening, by the first and second blades (1101, 110b), the lens hole (101) and close position closing, by the first and second blades (1101, 110b), the lens hole (101) may be accomplished by a stopper (102) and a stopper hole (112).

That is, each of the first and second blades (110a, 110b) may be formed with the stopper hole (112), where the stopper (102) may be protruded from a part of the base (100) exposed by the stopper hole (112). The stopper hole (112) may include a first contact unit (1121) corresponding to one inner lateral wall of the stopper hole (112) and a second contact unit (1122) corresponding to the other inner lateral wall of the stopper hole (112), where the stopper (102) may include a close unit (1021) corresponding to an outer lateral wall of the stopper (102) and an open unit (1022) corresponding to the other outer lateral wall of the stopper (102). At this time, a closed position of the first and second blades (110a, 110b) is defined by contact between the first contact unit (1121) and the close unit (1021) during closing operation of the first and second blades (110a 110b), and an open position of the first and second blades (110a 110b) is defined by contact between the first contact unit and the close unit during opening operation of the first and second blades (110a 110b).

Next, operation of the shutter device will be described in detail with reference to FIGS. 10 and 11.

Referring to FIG. 10, the first and second blades (110a, 110b) are locked at a close position. In a case the first magnetic pole unit (420a) is tightly contacted to a base wall about the guide (180), which is called a first contact position, the first blade (110a) cannot rotate any more, whereby the open position of the first blade (110a) is restricted.

In another exemplary embodiment, in a case the second contact unit (1122) of the stopper hole (112) is closely contacted to the open unit (1022) of the stopper (102), the first blade (110a) cannot rotate any more, whereby the open position of the first blade (110a) is restricted.

Meanwhile, regardless of supply of power to the coil (230), the shaking of the slider (400) is restricted by suction magnetic force generated by the magnet unit (420) and the yoke member (240), and a restoring force of the first and second blades (1101, 110b) to restoring to the close position is generated. As a result, the slider (400) and the first blade (110a) can maintain a predetermined position despite the external force including shock.

FIG. 10 illustrates a state in which the first blade (110a) starts to move to the open position with the close position as an initial position. The polarity of the electromagnetic force is as shown in the FIG. 10 based on the direction of current applied to the coil (230). According to the Fleming's left hand rule, the slide (400) may receive an electromagnetic force shifting to an open position which is a right hand direction, whereby the first blade (110a) starts to rotate to a position opening the lens hole (101).

Meanwhile, regardless of supply of power to the coil (230), the shaking of the slider (400) is restricted by suction magnetic force generated by the first and second magnetic pole units (420a, 420b) and the yoke member (240). As a result, the slider (400) can maintain the close position despite the external force.

Meanwhile, the shift speed of the shutter device reciprocating between the open position and the close position and position control accuracy including the shifting span may be adjusted by adjusting various design variables including intensity of current applied to the coil (230), magnetized capacities of the first and second magnetic pole units (420a, 420b), increase and decrease of area facing the coil (230), a formation position of base wall about the guide (180), a degree of lubrication to the guide (180) and material substance of the yoke member (240).

For example, adjustment of intensity of current applied to the core (230) can simply adjust the response speed of the shutter device in an accurate resolution. At this time, unlike the prior art, the power transfer formed at the actuator (500) and the number of parts for shift direction change can be greatly reduced to dispense with load generation resultant from clearances or movements between parts, thereby reducing the power consumption, whereby reliability and durability of the shutter device can be expectedly improved.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents

What is claimed is:

1. A shutter device, comprising:
a base with a lens hole;
first and second blades configured to rotate about a hinge in the base, and rotate to a closing position closing the lens hole and to an open position opening the lens hole; and
an actuator configured to include:
a magnet unit and a coil configured to generate a rotation moment for the first and second blades, and
a restoring unit configured to restore the first and second blades to the closed position when power is not supplied to the coil, wherein the actuator further comprises a slider and a yoke member, and the yoke member comprises a first lug, a second lug and a third lug, where the coil passes a discrete space between the first and second lugs, and is wound in the shape of a hollow pillar passing a discrete space between the second and third lugs, and wherein the second lug is not equidistant between the first and third lugs such that a restoring force is applied to the slider in a closing direction.

2. The shutter device of claim 1, wherein the slider comprises a boss coupled to the first and second blades at an area eccentrically positioned from the hinge, the slider being attached to the magnet unit to linearly shift along with the magnet unit and to provide the rotation moment to the first and second blades through the boss, and the yoke member of magnetic substance is arranged at a periphery of the coil.

3. The shutter device of claim 1, wherein the first to third lugs are so arranged as to allow a magnetic force acting on the first to third lugs and the magnet unit to be eccentrically effected to one side relative to a linearly shifting direction of the slide.

4. The shutter device of claim 1, wherein the actuator further comprises yoke member further comprises:
a flat type body unit, and,
an opening unit in which a part of the body unit corresponding to a gap between the first lug and the second lug is opened,
wherein the third lug is formed by bending a margin of the opening unit to face the first lug across a part of the body unit.

5. The shutter device of claim 1, wherein the actuator further comprises a slider and a yoke member, and the yoke member comprises a first lug, a second lug and a third lug, where the first and third lugs are arranged outside of the coil, while the second lug is arranged inside the coil.

6. The shutter device of claim 1, wherein the slider comprises a first bending unit and a second bending unit attached to a lateral surface of the magnet unit, where the first bending unit allows the slider to be guided in a linear shift by shifting along a guide at the base in a contacted state.

* * * * *